United States Patent
Varghese et al.

(10) Patent No.: US 11,543,966 B1
(45) Date of Patent: Jan. 3, 2023

(54) DIRECT DISCOVERY CONTROLLER MULTICAST CHANGE NOTIFICATIONS FOR NON-VOLATILE MEMORY EXPRESS™ OVER FABRICS (NVME-OF™) ENVIRONMENTS

(71) Applicant: DELL PRODUCTS L.P., Round Rock, TX (US)

(72) Inventors: Vibin Varghese, Chennai (IN); Saravanan Obulisami, Chennai (IN); Erik Smith, Douglas, MA (US); Ramesh Kumar Subbiah, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/499,842

(22) Filed: Oct. 12, 2021

(51) Int. Cl.
*G06F 3/06* (2006.01)

(52) U.S. Cl.
CPC .............. *G06F 3/061* (2013.01); *G06F 3/067* (2013.01); *G06F 3/0655* (2013.01)

(58) Field of Classification Search
None
See application file for complete search history.

(56) References Cited

U.S. PATENT DOCUMENTS

2021/0397351 A1* 12/2021 Dhatchinamoorthy ..................... G06F 3/0607
2022/0231905 A1* 7/2022 Dhatchinamoorthy ..................... H04L 41/0668

* cited by examiner

Primary Examiner — Brian R Peugh
(74) Attorney, Agent, or Firm — North Weber & Baugh LLP

(57) ABSTRACT

System and methods for using a discovery controller to establish network connections in a network that comprises Non-Volatile Memory Express™ over fabrics (NVMe-oF™) entities that support multicast change notifications comprise: in response to a change that affects at an NVMe-oF™ entity that has not yet established a connection with the discovery controller, generating a multicast change notification (MCN) that notifies the unconnected entity of the change and automatically communicating the MCN to the unconnected entity without requiring an explicit persistent connection to the discovery controller, e.g., to access storage ports in the network.

20 Claims, 6 Drawing Sheets

200

205 — AT A DISCOVERY CONTROLLER (DC) IN A NETWORK THAT COMPRISES NVMe-oF ENTITIES, IN RESPONSE TO A CHANGE, WHICH AFFECTS AT LEAST ONE OF THE NVMe-oF ENTITIES THAT HAS NOT YET ESTABLISHED A CONNECTION WITH THE DC, GENERATE A MULTICAST CHANGE NOTIFICATION (MCN) THAT NOTIFIES THE AT LEAST ONE NVMe-oF ENTITY OF THE CHANGE

210 — COMMUNICATE THE MCN TO THE AT LEAST ONE NVMe-oF ENTITY WITHOUT REQUIRING AN EXPLICIT PERSISTENT CONNECTION BETWEEN THE DC AND THE NVMe-oF ENTITY

```
┌─────────────────────────────────────────────────┐
│ AT AN NVMe-oF ENTITY THAT HAS NOT YET ESTABLISHED│
│ A CONNECTION WITH A DISCOVERY CONTROLLER (DC),   │
│ RECEIVE A MULTICAST CHANGE NOTIFICATION (MCN)    │─── 305
│ THAT INDICATES A CHANGE THAT AFFECTS THE NVME-   │
│ OF ENTITY, WITHOUT REQUIRING AN EXPLICIT         │
│ PERSISTENT CONNECTION BETWEEN THE DC AND THE     │
│ NVME-OF ENTITY                                   │
└─────────────────────────────────────────────────┘
                          │
                          ▼
┌─────────────────────────────────────────────────┐
│ INITIATE A CONNECTION WITH THE DC TO DISCOVER    │
│ SUBSYSTEMS IN A NETWORK THAT THE NVME-OF ENTITY  │─── 310
│ CAN ESTABLISH A COMMUNICATION WITH               │
└─────────────────────────────────────────────────┘
```

FIG. 3

DIRECT DISCOVERY CONTROLLER MULTICAST CHANGE NOTIFICATIONS FOR NON-VOLATILE MEMORY EXPRESS™ OVER FABRICS (NVME-OF™) ENVIRONMENTS

BACKGROUND

A. Technical Field

The present disclosure relates generally to information handling systems. More particularly, the present disclosure relates to network communications systems and methods for discovery automation.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, Non-Volatile Memory Express™ over fabrics (NVMe-oF™) supports Asynchronous Event Notifications (AENs) between a discovery controller (DC) and end-devices, such as host and subsystems, only when an explicit persistent connection has been established between, e.g., an end-device and a Centralized Discovery Controller (CDC) or Direct Discovery Controller (DDC). Typically, end-devices use Asynchronous Event Registration (AER) to register with the DC, such that when network information on the DC changes, end-devices can obtain information about that change in via an AEN.

However, in existing systems, in scenarios when one or more unconnected end-devices are present in the network, i.e., end-devices that have yet to establish a connection to the DC, for example because they were denied a connection, such end-devices may be negatively impacted by a configuration change on the subsystem, e.g., when the namespace masking definition has been updated, which may allow the end-device that should connect to the subsystem. As an example, in an environment that has one host, ten DDCs with ten DDC interfaces, and no CDC, for the host to connect to the ten DDC interfaces to perform discovery functions, an explicit persistent connection would be required to establish ten respective connections. Traditionally, a host administrator will have to intervene and manually connect the host and the DDCs that are impacted by the configuration change, before the hosts will be able to detect the configuration change. Disadvantageously, such procedures consume resources on both the host side and the subsystem side.

Accordingly, it is highly desirable to have a systems and methods in which a subsystem can automatically notify impacted end-devices of configuration changes without requiring a connection between them to be established first, especially in networks where no CDC is present.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 2 is a flowchart of an illustrative process for using a discovery controller to establish network connections in an NVMe-oF™ environment, according to embodiments of the present disclosure.

FIG. 3 is a flowchart of an illustrative process for connecting to a DC, according to embodiments of the present disclosure.

DETAILED DESCRIPTION OF EMBODIMENTS

Figure 1:
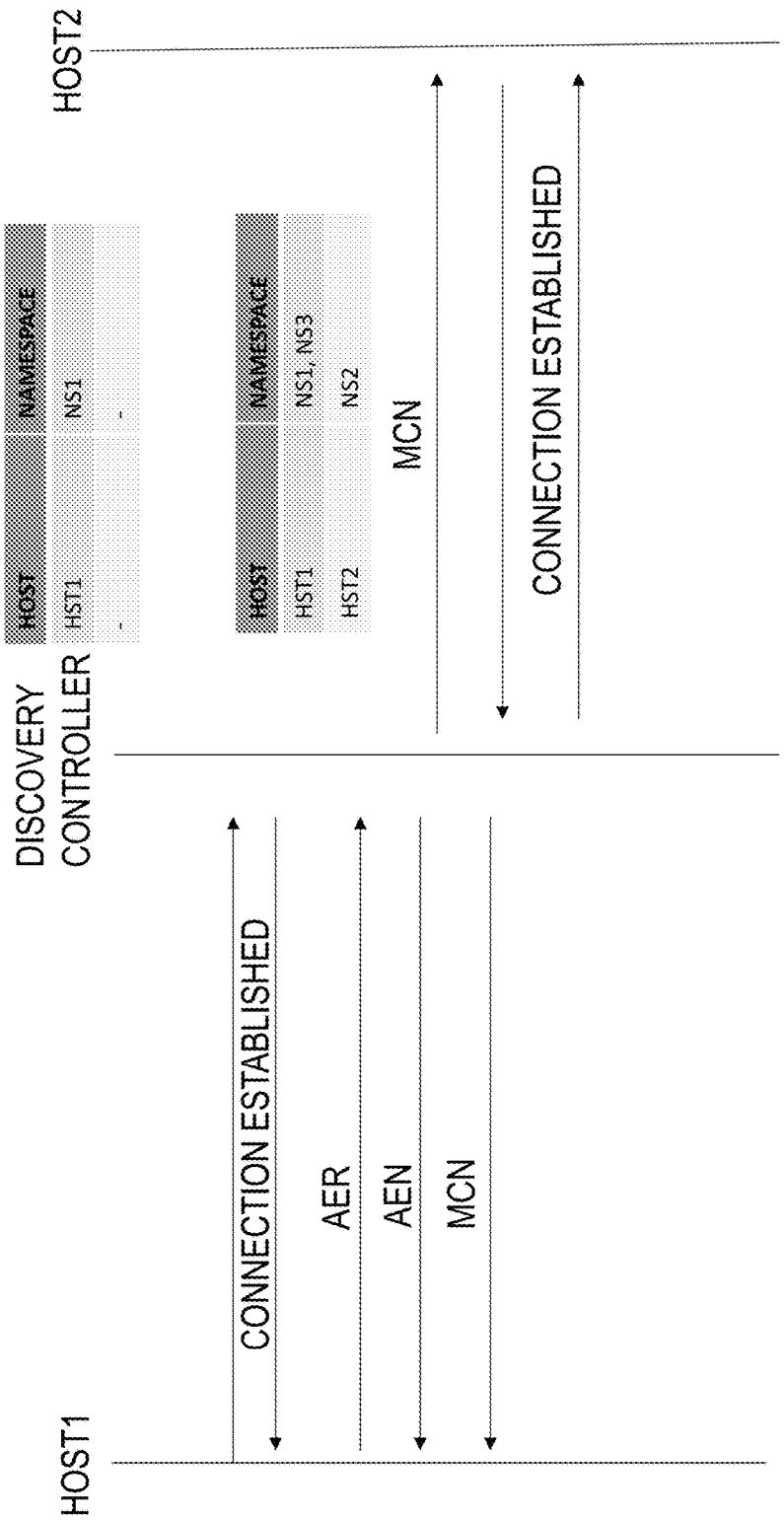
FIG. 1 ("FIG. 1") depicts a ladder diagram that illustrates a method for using a discovery controller to establish network connections in an NVMe-oF™ environment, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

Any headings used herein are for organizational purposes only and shall not be used to limit the scope of the description or the claims. Each reference or document mentioned in this patent document is incorporated by reference herein in its entirety.

It shall be noted that although embodiments described herein may be within the context of a DDC environment, aspects of the present disclosure are not so limited. Accordingly, the aspects of the present disclosure may be applied or adapted for use in other contexts, e.g., those that do not employ a CDC.

FIG. 1 depicts a ladder/flow diagram that illustrates a method for using a discovery controller to establish network connections in an NVMe-oF™ environment, according to embodiments of the present disclosure. The ladder diagram depicts a communication between a discovery controller (e.g., a DDC) and two hosts (denoted as Host 1 and Host 2) and a list of host-to-namespace mappings. Both hosts in the example are assumed to support discovery controller MCNs.

Oftentimes, a discovery controller determines whether a host that attempts to establish am NVMe™ connection to the discovery controller has any available namespaces and, if not, the discovery controller will reject the connection. If a change such as a change on a storage port that the discovery controller is connected to occurs, the discovery controller will issue no AENs to the host if the requisite connection between the discovery controller and the host is missing, e.g., because it has not yet been established or because the host does not have namespaces. In these scenarios, it would be beneficial if the discovery controller could notify impacted host prior to establishing the NVMe™ connection. Therefore, in one or more embodiments, a novel Multicast Change Notification (MCN) system is introduced that provides such notification to impacted hosts. For example, when a user makes a change to a discovery log page of the discovery controller, the discovery controller may generate a Change Notification table, such as that shown in Table 1, which may comprise a list of affected hosts, here, Host 2 or subsystems that may act as a host for any purpose.

TABLE 1

Change Notification table

| Subsystem NQN | HOST NQNs | Explicit Persistent Connection | AEN/MCN |
|---|---|---|---|
| SNQN | HST1NQN | Yes | AEN |
| | HST2QN | No | MCN |

It is understood that a suitable change notification table may comprise each affected host's connection status and other useful information.

As depicted in the example in FIG. 1, Host 1 may establish a connection with the discovery controller and, in response to sending an AER to the discovery controller, Host 1 may obtain an AEN from the discovery controller. Since a connection between Host 1 and this particular discovery controller has already been established, the discovery controller needs to take no specific action.

In contrast, Host 2 has not yet established a proper connection with the discovery controller. Therefore, in one or more embodiments, in response to a change being made to the discovery log page that affects Host 2, the discovery controller may generate and communicate an MCN to Host 2 (and other end-devices in the network) to notify end-devices of those changes.

In one or more embodiments, the discovery controller may communicate the generated MCNs without first requiring that an explicit persistent connection between the discovery controller and unconnected end-device(s) be established.

In one or more embodiments, Host 2 may send a join request command to the MCN multicast address, e.g., in an Internet Group Management Protocol (IGMP) packet that indicates that the sending end-device that support MCNs, here, Host 2 accepts multicast notifications of this type and wants to join the group. In addition, Host 2 may begin listening to the multicast address sent by the discovery controller.

In one or more embodiments, once Host 2 receives the MCN from the discovery controller, Host 2 may initiate an NVMe™ connection to the discovery controller. For example, an NVMe™ host may connect to a Discovery Controller in a Discovery Service using TCP port 8009. In short, once a change in a log page of a particular discovery controller occurs, the discovery controller may send a multicast notification for discovery log page updates. In this manner, the discovery controller may automatically notify impacted end-device, here Host 2, of configuration changes without requiring a connection between the discovery controller and Host 2.

In one or more embodiments, once an NVMe™ connection is initiated, the discovery controller may be initialized or set up to facilitate proper operation in the NVMe-oF™ environment to exchange information with Host 2 and for other uses, e.g., according to NVMe™ and/or other protocols.

In one or more embodiments, Host 2 may use an NVMe-oF™ Get Log Page command to retrieve the network information that aids in determining what has changed and/or discover what subsystems can communicate with Host 2.

In one or more embodiments, the discovery controller, e.g., a DDC, may generate an MCN by using an MCN frame that may be formed according to the format shown in exemplary Table 2 below.

TABLE 2

| MCN Frame Format | | | |
|---|---|---|---|
| MCN Frame Format | | | |
| Destination MAC | Multicast MAC | | |
| Source MAC | DDC MAC | | |
| Destination IP | Multicast IP | | |
| Source IP | DDC IP | | |
| UDP Header | Destination Port | Source Port | . . . |
| Payload | List of affected NQNs | NQN1 | NQN1 |

As shown, in Table 2, the MCN may comprise a payload that may comprise a list of all affected NVMe™ qualified names (NQNs) that identify specific hosts. All devices for which MCNs have been sent are expected to establish a connection with the DDC. In one or more embodiments, if the connection fails, the discovery controller may resend the MCN to unconnected end-devices. And if an attempt to resend the MCN is unsuccessful, a user may be notified, e.g., via a message or alarm, and the table may be deleted.

It is understood that not all devices in a network need to participate in the MCN scheme. For example, devices that have been already connected to the discovery controller (e.g., Host 1 in FIG. 1) from which that device may obtain an AEN need not be part of the MCN scheme to automatically obtain discovery log page updates in the in an NVMe-oF™ environment.

FIG. 2 is a flowchart of an illustrative process for using a discovery controller to establish network connections in an NVMe-oF™ environment, according to embodiments of the present disclosure. In one or more embodiments, process (200) for using a discovery controller may begin when, e.g., at a DC in a network that comprises NVMe-oF™ entities, in response to a change, which affects at least one of the NVMe-oF™ entities that has not yet established a connection with the DC, an MCN is generated (205). The MCN may be used to notify the NVMe-oF™ entity of that change and may be communicated (210) to the NVMe-oF™ entity, without requiring an explicit persistent connection between the DC and the NVMe-oF™ entity.

It shall be noted that: (1) certain steps may optionally be performed; (2) steps may not be limited to the specific order set forth herein; (3) certain steps may be performed in different orders; and (4) certain steps may be done concurrently.

FIG. 3 is a flowchart of an illustrative process for connecting to a DC (e.g., a DDC), according to embodiments of the present disclosure. In one or more embodiments, process (300) for connecting to a discovery controller may begin when, e.g., an NVMe-oF™ entity that has not yet established a connection with a discovery DC receives (305) an MCN that indicates a change that affects the NVMe-oF™ entity, without requiring an explicit persistent connection between the DC and the NVMe-oF™ entity. Then, a connection with the DC may be initiated (310) to discover subsystems in a network that the NVMe-oF™ entity can establish a communication with.

In one or more embodiments herein, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

Figure 4:
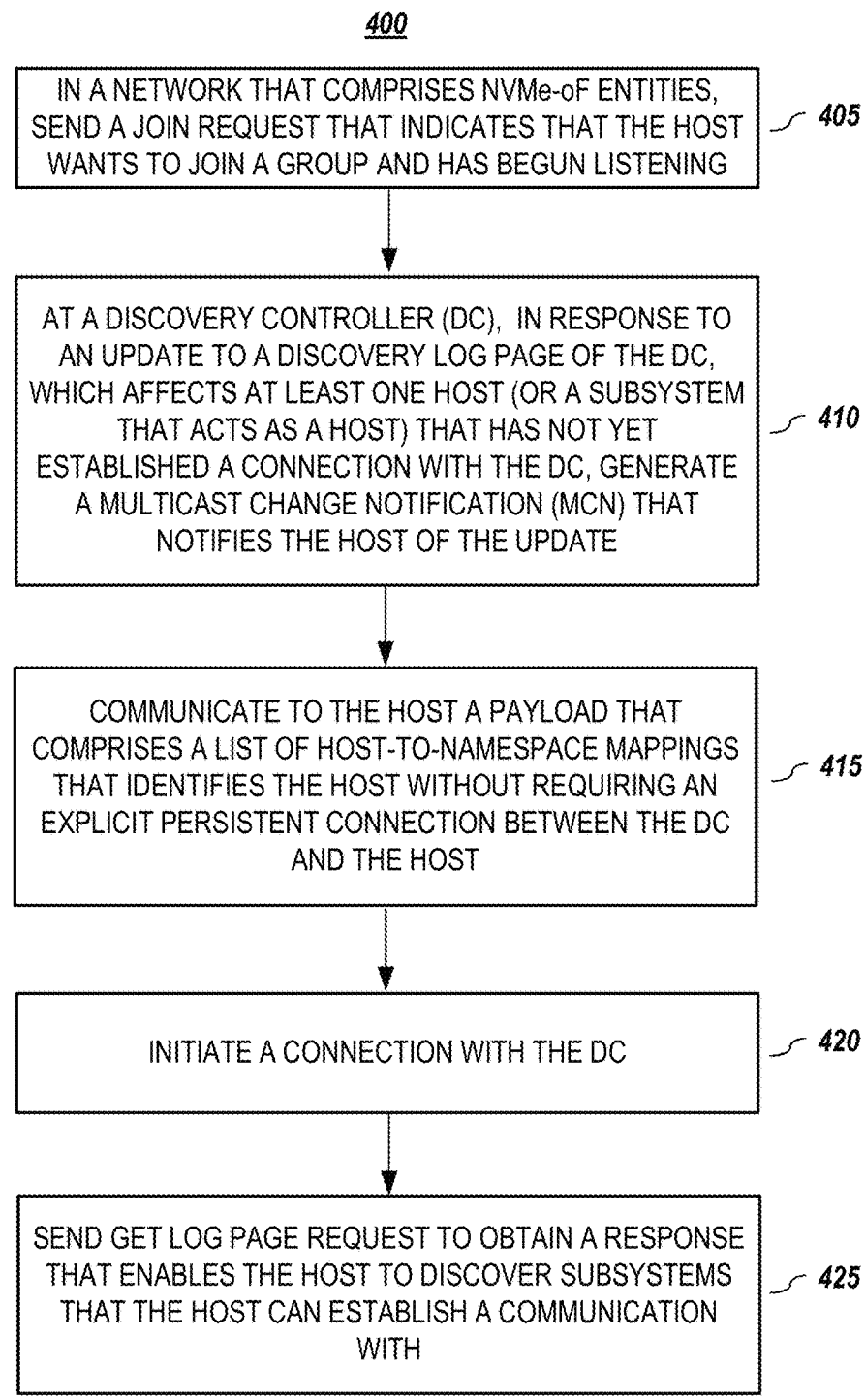
FIG. 4 is a flowchart of an alternative process for using a discovery controller to establish network connections in an NVMe-oF™ environment, according to embodiments of the present disclosure.

FIG. 4 shows a flowchart of an alternative process for using a DC (e.g., a DDC) to establish network connections in an NVMe-oF™ environment, according to embodiments of the present disclosure. In one or more embodiments, process (400) may begin when e.g., a host in a network that comprises NVMe-oF™ entities sends (405) a join request that indicates that the host wants to join a group and has begun listening. At a discovery controller, in response to an update to a discovery log page of the discovery controller, which affects at least one host (or a subsystem that acts as a host) that has not yet established a connection with the discovery controller, an MCN may be generated (410) to notify the host of the update. The discovery controller may communicate (415) to the host a payload that comprises, e.g., a list of host-to-namespace mappings that identifies the host without requiring an explicit persistent connection between the discovery controller and the host. In one or more embodiments, the host may initiate (420) a connection with the discovery controller, e.g., to exchange information with the host, e.g., according to NVMe™ and/or other protocols. In one or more embodiments, the discovery controller may be initialized or set up to facilitate proper operation in the NVMe-oF™ environment to exchange information with the host and for other uses, e.g., according to NVMe™ and/or other protocols. Finally, the host may send (425) a Get Log Page request to receive from the discovery controller a Get Log Page response that enables the host to discover subsystems that the host can establish a communication with.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price.

The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 5:
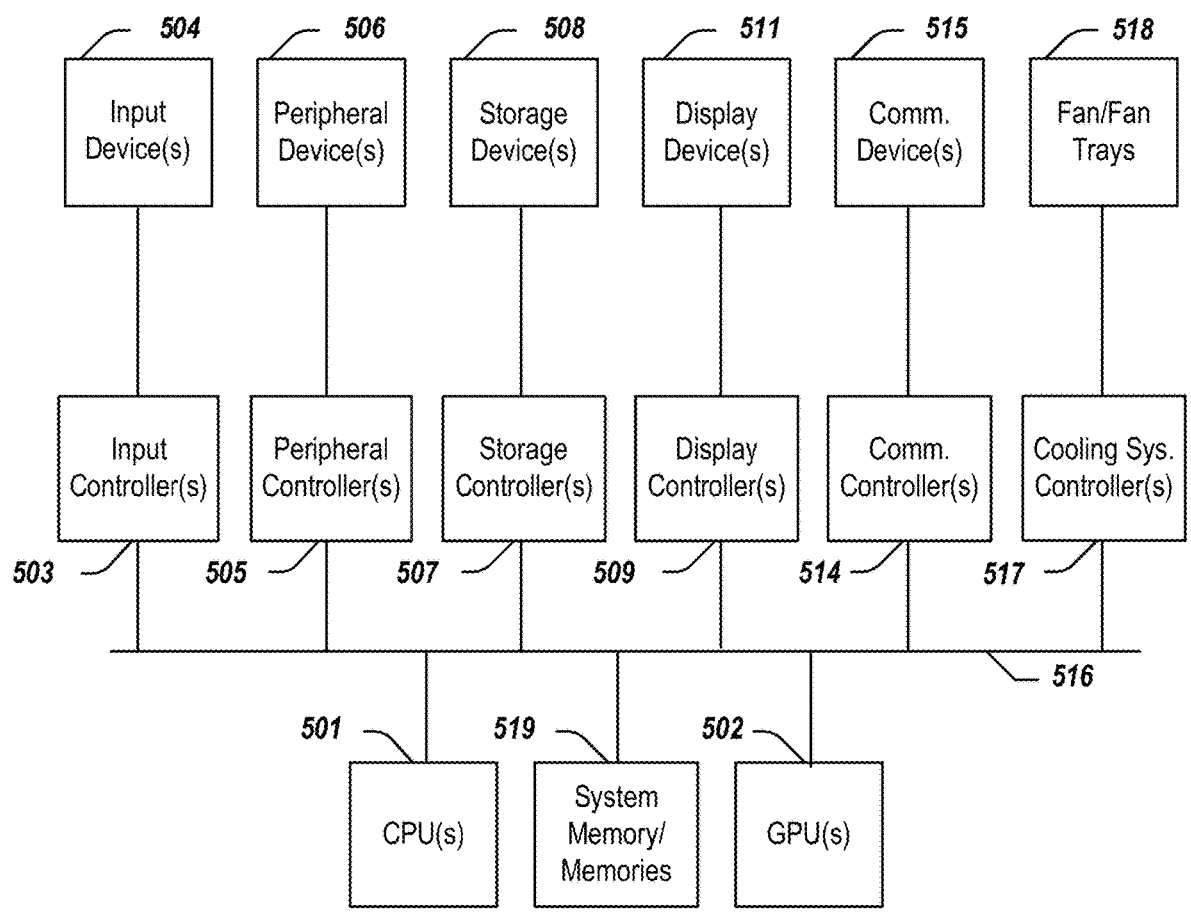
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more CPUs 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, stylus, microphone, camera, trackpad, display, etc. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
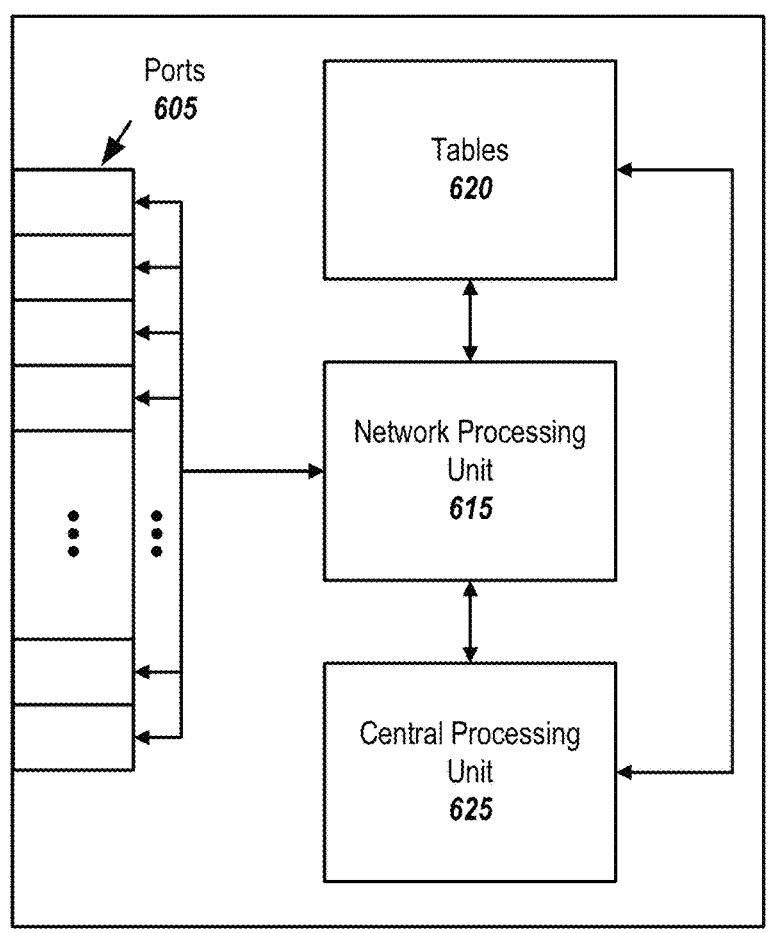
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a CPU 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for using a discovery controller (DC) to establish network connections in a non-volatile memory express over fabrics (NVMe-oF™) environment, the method comprising:
   at a DC in a network that comprises NVMe-oF™ entities,
      in response to a change, which affects at least one of the NVMe-oF™ entities that has not yet established a connection with the DC, generating a multicast change notification (MCN) that notifies the at least one NVMe-oF™ entity of the change;
   communicating the MCN to the at least one NVMe-oF™ entity without requiring an explicit persistent connection between the DC and the NVMe-oF™ entity; and
   in response to the at least one NVMe-oF™ entity initiating a connection, establishing the connection.

2. The computer-implemented method of claim 1, wherein the change comprises an update to a discovery log page of the DC.

3. The computer-implemented method of claim 1, wherein the at least one NVMe-oF™ entity comprises at least one of an end-device or a host.

4. The computer-implemented method of claim 1, wherein the at least one NVMe-oF™ entity comprises a subsystem that acts as a host.

5. The computer-implemented method of claim 1, wherein the MCN comprises a list of host-to-namespace mappings that is communicated in a payload that identifies affected hosts.

6. The computer-implemented method of claim 5, wherein the payload comprises a table that identifies hosts by their NVMe qualified names (NQNs).

7. The computer-implemented method of claim 5, wherein the MCN comprises a connection status for at least one of the affected hosts.

8. The computer-implemented method of claim 1, further comprising, in response to the connection not being established, making an attempt to resend the MCN to the at least one NVMe-oF™ entity.

9. The computer-implemented method of claim 8, further comprising, in response the attempt to resend the MCN being unsuccessful, performing steps comprising at least one of generating a notification, generating an alarm, or deleting the MCN.

10. A computer-implemented method for connecting to a discovery controller (DC) to establish network connections in a non-volatile memory express over fabrics (NVMe-oF™) environment, the method comprising:
    at an NVMe-oF™ entity that has not yet established a connection with a DC, receiving a multicast change notification (MCN) that indicates a change that affects the NVMe-oF™ entity, without requiring an explicit persistent connection between the DC and the NVMe-oF™ entity; and
    initiating a connection with the DC to discover subsystems in a network that the NVMe-oF™ entity can establish a communication with.

11. The computer-implemented method of claim 10, further comprising, communicating to an MCN multicast address a join request that indicates that the NVMe-oF™ entity wants to join a group.

12. The computer-implemented method of claim 10, further comprising, in response to receiving the MCN, initiating the connection with the DC.

13. The computer-implemented method of claim 10, wherein initiating the connection comprises communicating an NVMe-oF™ Get Log Page command to retrieve a discovery log page.

14. The computer-implemented method of claim 13, wherein the discovery log page enables the NVMe-oF™ entity to discover the subsystems.

15. A system for using a discovery controller in a non-volatile memory express over fabrics (NVMe-oF™) system, the system comprising:
    one or more processors; and
    a non-transitory computer-readable medium or media comprising one or more sets of instructions which, when executed by at least one of the one or more processors, causes steps to be performed comprising:
       in response to a change that affects an NVMe-oF™ entity that has not yet established a connection with a discovery controller, generating a multicast change notification (MCN) that notifies the NVMe-oF™ entity of the change;

communicating the MCN to the NVMe-oF™ entity without requiring an explicit persistent connection between the discovery controller and the NVMe-oF™ entity; and in response to the at least one NVMe-oF™ entity initiating a connection, establishing the connection.

16. The system of claim 15, wherein the change comprises an update to a discovery log page of the discovery controller.

17. The system of claim 15, wherein the NVMe-oF™ entity comprises at least one of an end-device, a host, or a subsystem that acts as a host.

18. The system of claim 15, wherein the MCN comprises a list of host-to-namespace mappings that is communicated in a payload that identifies affected hosts.

19. The system of claim 18, wherein the payload comprises a table that identifies hosts by their NVMe qualified names (NQNs).

20. The system of claim 15, wherein the discovery controller, in response to the connection not being established, performs steps comprising at least one of resending the MCN to the NVMe-oF™ entity or generating a notification.

\* \* \* \* \*